Figure 1:
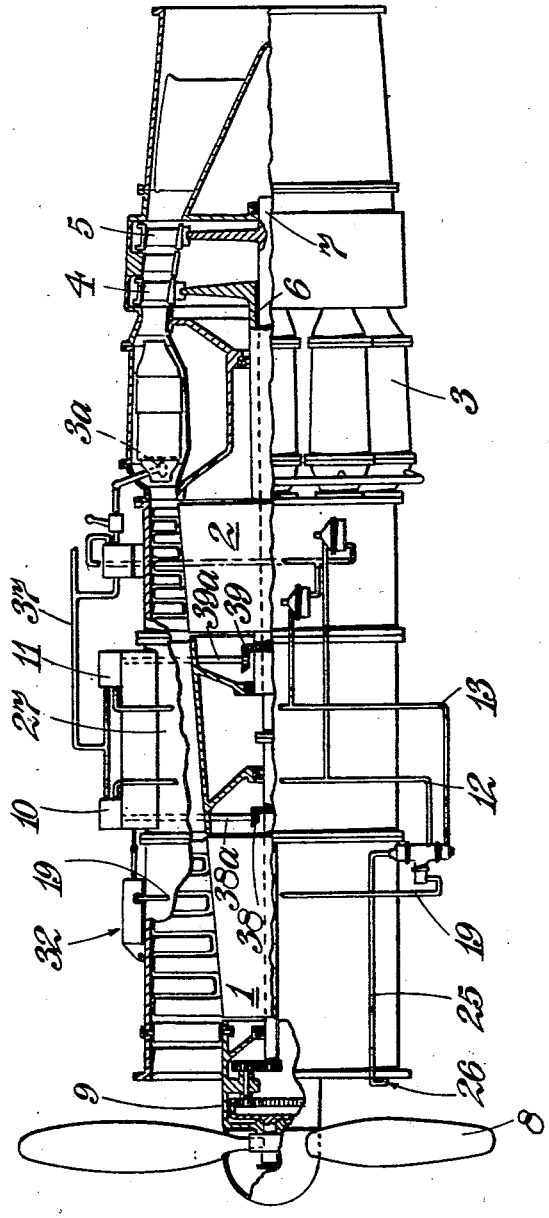

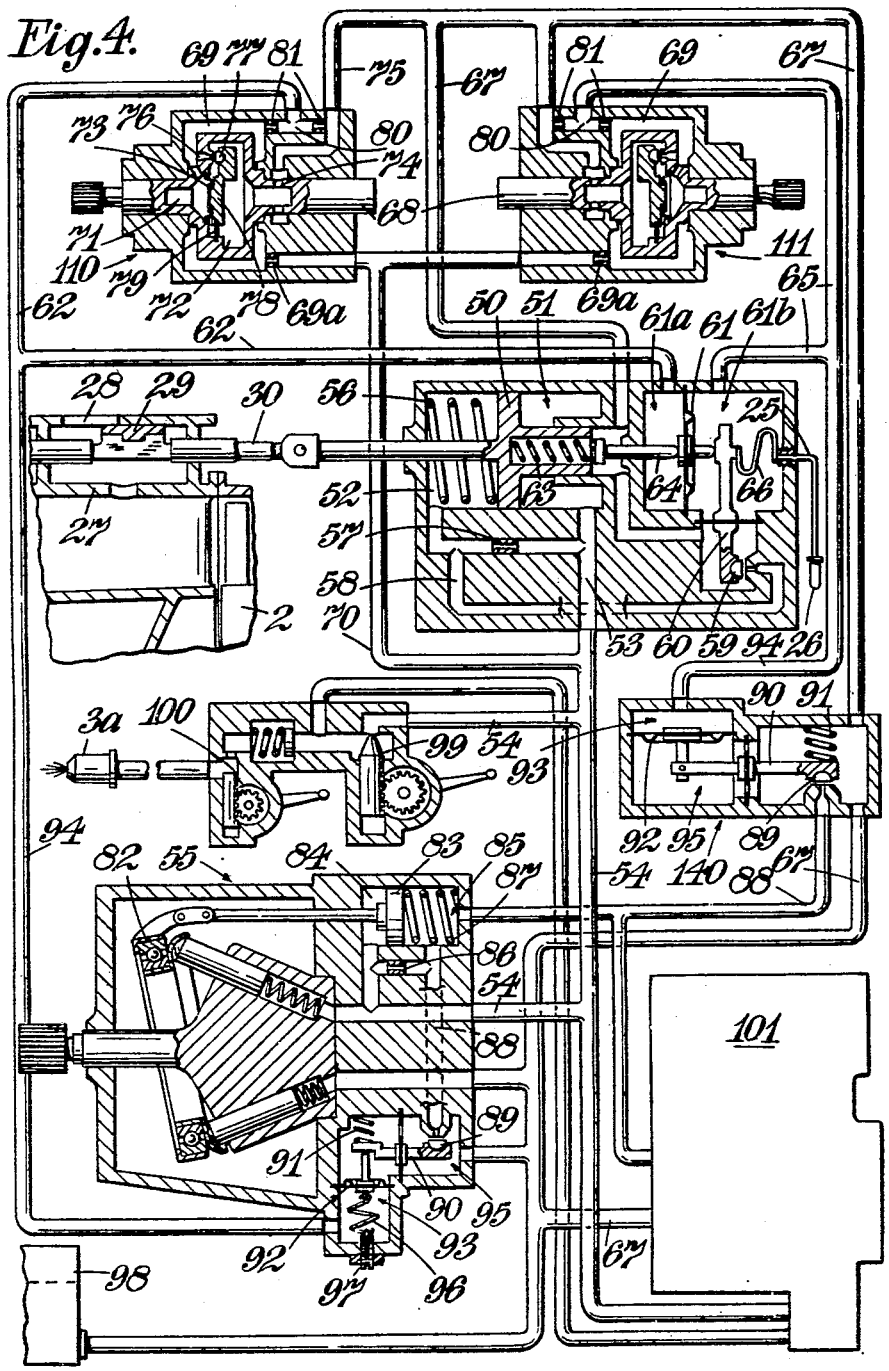

2,785,848

GAS TURBINE ENGINES WITH SPEED CONTROL MECHANISM

Adrian Albert Lombard, Quarndon, and Christopher Linley Johnson, Allestree, England, assignors to Rolls-Royce Limited, Derby, England, a British company Application August 16, 1954, Serial No. 449,856

Claims priority, application Great Britain August 28, 1953

9 Claims. (Cl. 230—114)

This invention relates to gas-turbine engines of the kind having a low-pressure compressor, a high-pressure compressor, combustion equipment, a high-pressure turbine and a low-pressure turbine arranged in flow series, the high-pressure compressor being connected to the high-pressure turbine to be driven thereby and the low-pressure compressor being connected to the low-pressure turbine to be driven thereby, and in which the low-pressure turbine is connected either directly or through a reduction gear to a propeller. Such an engine will be referred to as "a gas turbine engine of the type described."

According to this invention, a gas turbine engine of the type described comprises a bleed valve through which air compressed in the low-pressure compressor is vented to atmosphere, whereby surging of the low-pressure compressor is avoided on reduction of the rotational speed of the high-pressure compressor relative to the rotational speed of the low-pressure compressor. Preferably there is provided control mechanism responsive to a pre-selected relation between the rotational speed of the high-pressure compressor and the rotational speed of the low-pressure compressor and operative to open the bleed valve when the rotational speed of the low-pressure compressor exceeds the value thereof determined by the pre-selected relation and the instantaneous value of the rotational speed of the high-pressure compressor. The pre-selected relation may be varied in accordance with the ambient atmospheric temperature.

It has been found that if the rotational speed of the low-pressure compressor exceeds a certain value which is determined by the instantaneous rotational speed of the high-pressure compressor, the high-pressure compressor is unable to accept the minimum mass flow which can be delivered by the low-pressure compressor at that rotational speed, and as a result surging of the low-pressure compressor occurs. It is, however, desirable under certain conditions of operation to increase the rotational speed of the low-pressure compressor above the value corresponding to said preselected relation; for example when an aircraft propelled by a gas turbine engine of the type described is approaching to land, it is desirable to maintain the rotational speed of the low-pressure compressor and of the propeller connected to it at a comparatively high value, while reducing the power developed by reducing the rotational speed of the high-pressure compressor, in order to permit the rapid acceleration of the engine should the aircraft be baulked in landing. Opening of the blow-off valve enables such a condition to be maintained without surging of the low-pressure compressor.

In accordance with a feature of this invention there are provided a pair of rotatively-driven devices each of which is adapted to produce a fluid pressure which is a function of its rotational speed, one of said devices being connected to be driven at a rotational speed proportional to that of the low-pressure compressor and the other of the devices being connected to be driven at a rotational speed proportional to that of the high-pressure compressor, and a pressure-sensitive device connected to be subjected differentially to the fluid pressures developed by the devices and connected to the bleed valve to operate it when the rotational speed of the low-pressure compressor exceeds the value thereof determined by the preselected relation and the rotational speed of the high-pressure compressor.

According to another feature of the invention said pressure-sensitive device may be subjected to a resilient load in the same sense as the load which is a function of the rotational speed of the low-pressure compressor.

According to another feature of the invention the pressure-sensitive device may be subjected to a load which increases with increase of the ambient atmospheric temperature and which acts in the same sense as the pressure load which is a function of the rotational speed of the low-pressure compressor.

In accordance with yet another feature of this invention the pressure-sensitive device may be connected to operate said bleed valve through a servo mechanism, the servo mechanism being spring-loaded in the sense of opening the bleed valve and being arranged to be closed by a fluid pressure load when the rotational speed of the low-pressure compressor falls below the value thereof determined by the pre-selected relation and the instantaneous value of the rotational speed of the high-pressure compressor.

Figure 2:
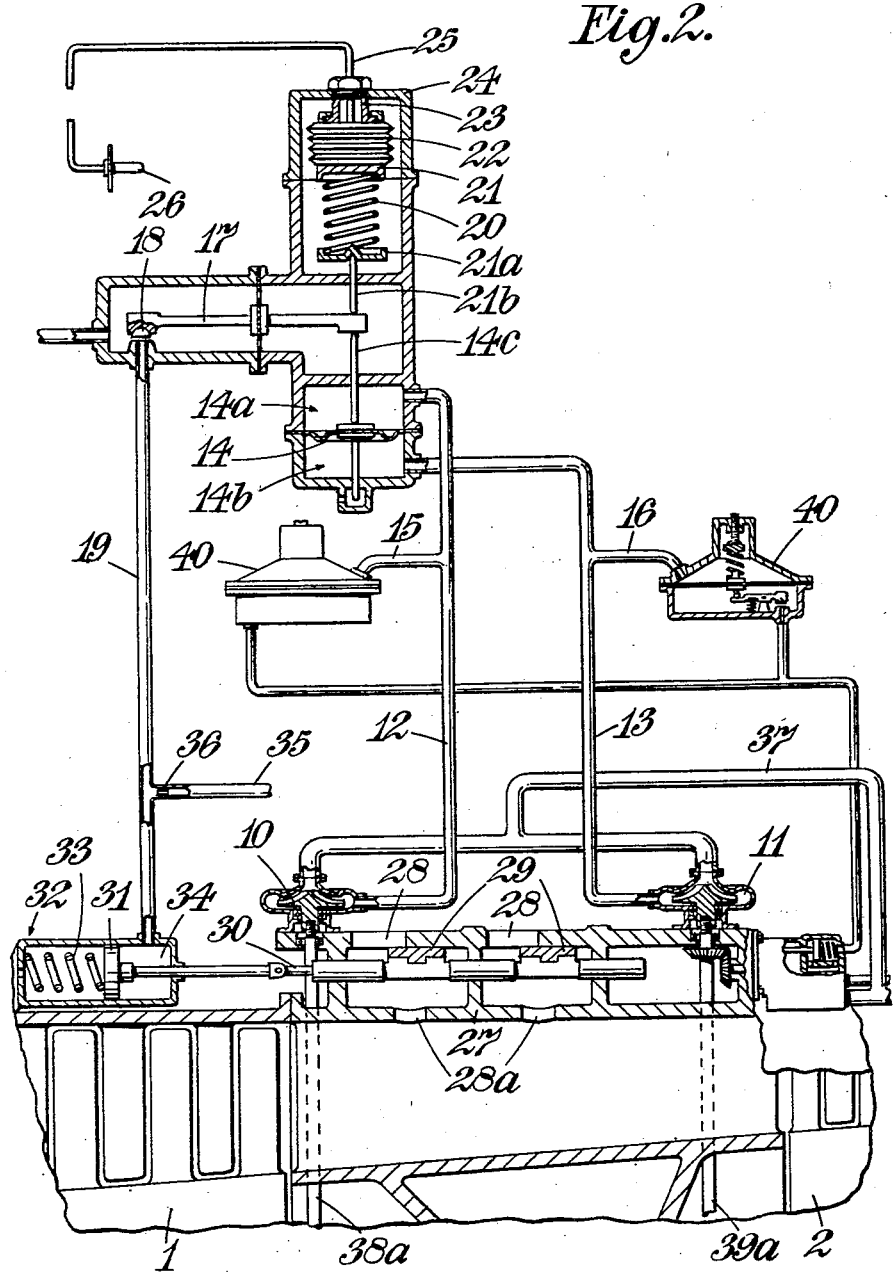
Figure 3:
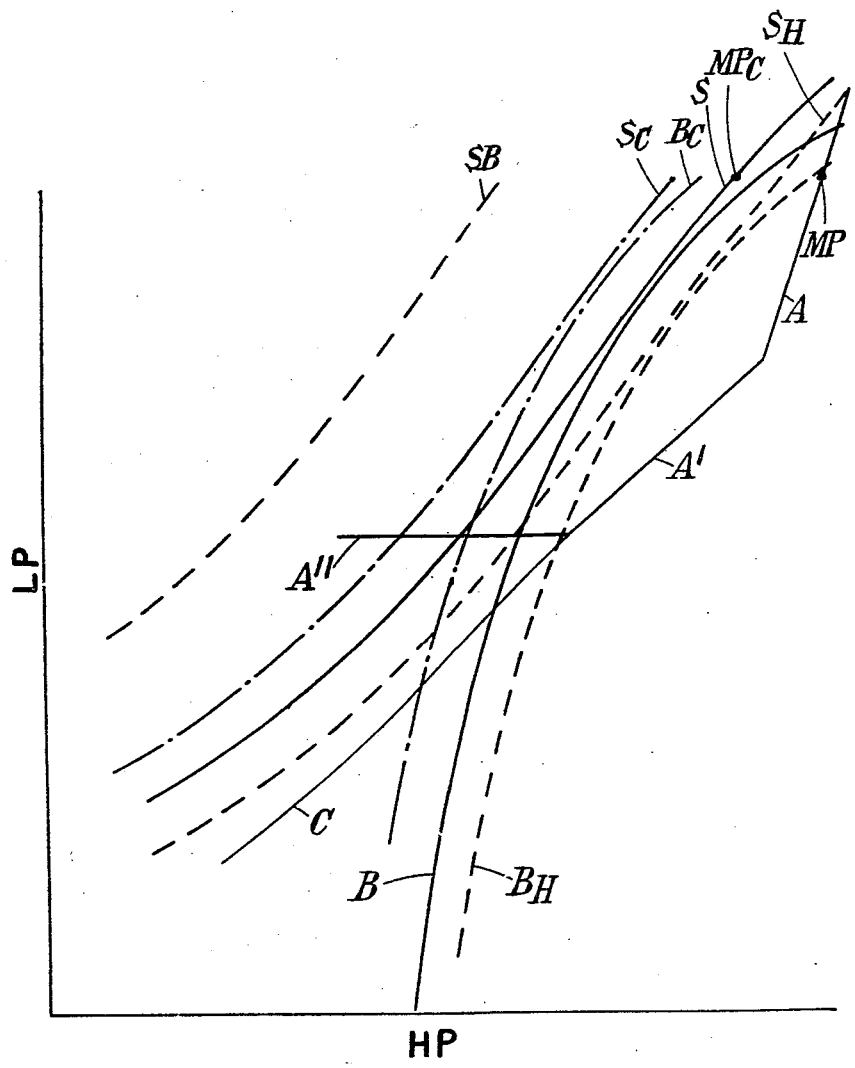

Some embodiments of this invention will now be described by way of example with reference to the accompanying drawings, in which:

Figure 1 shows a gas-turbine engine of the type described fitted with a bleed valve and control mechanism in accordance with the invention, Figure 2 illustrates parts of Figure 1 in more detail, Figure 3 illustrates graphically an effect of the invention, and Figure 4 illustrates a second form of control mechanism for adjusting the bleed valve.

Referring to Figure 1, the engine comprises a low-pressure compressor 1 which draws in air from the air intake of the aircraft, a high-pressure compressor 2 which receives air compressed by the low-pressure compressor 1, combustion equipment 3 to which the air compressed by the high-pressure compressor 2 is delivered and wherein the air has fuel burnt with it, a high-pressure turbine 4 receiving products of combustion from the combustion equipment 3, and a low-pressure turbine 5 receiving the gases exhausted from the high-pressure turbine 4. The exhaust from the low-pressure turbine 5 passes into the jet pipe of the engine and is delivered to atmosphere. The high-pressure turbine 4 is connected by a hollow shaft 6 to the high-pressure compressor 2 to drive it, and the low-pressure turbine 5 is connected by a shaft 7 to the low-pressure compressor 1 to drive it. The shaft 7 is arranged co-axially with and extends through the high-pressure shaft 6. The low-pressure turbine 5 also drives a propeller 8 through reduction gearing 9.

Referring now to Figure 2, the embodiment of control system in accordance with this invention therein illustrated comprises a centrifugal pump device 10 having its inlet connected to the low-pressure fuel pipe 37 of the main engine fuel pump, or any other suitable source of fluid, and having its impeller 10 driven by a shaft 38a connected through gearing 38 (Figure 1) to the low-pressure shaft 7. The system also comprises a second centrifugal pump device 11 having its inlet connected to the same source 37 as the pump device 10 and having its impeller driven by a shaft 39a connected through gearing 39 (Figure 1) to the high-pressure compressor rotor 2.

Connected to the delivery sides of the pump devices 10, 11 are ducts 12, 13 respectively which are connected to chambers 14a, 14b on opposite sides of a flexible diaphragm 14. The flexible diaphragm 14 is thus loaded by pressures which are respectively proportional to the squares on the rotational speeds of the low-pressure and high-pressure rotors.

Tappings 15, 16 may, as shown, be taken from ducts 12, 13 respectively to governor devices 40 forming part of the fuel supply system to the fuel injectors 3a of the combustion equipment of the engine, and the governor devices 40 may be arranged to reduce the fuel supply to the fuel injectors 3a, in any known or convenient way, when the pressure in the appropriate duct 12 or 13 corresponds to the maximum permissible rotational speed of the low-pressure rotor or high-pressure rotor respectively.

The diaphragm 14 is adapted to load one end of a pivotally-mounted lever 17 through a push rod 14c. The lever at its other end carries a half-ball valve 18 which co-operates with the outlet of a vent pipe 19. The arrangement is such that increase of the pressure developed by the pump device 10 driven by the low-pressure rotor, relative to the pressure developed by the pump device 11, tends to raise half-ball valve 18 off its seating. The lever 17 is also loaded in the sense of opening the half-ball valve 18 by a spring 20, and one abutment 21 for the spring 20 is arranged to be adjustable both manually and in accordance with the ambient atmospheric temperature (which term includes the engine intake temperature). This is effected by arranging that the abutment 21 is carried by one end of a capsule or bellows 22, the other end of which is attached to a threaded part 23 whereby it is manually adjustable in the casing 24. The interior of the capsule or bellows 22 is connected by means of a capillary tube 25 to a temperature-sensitive element 26, for example of the liquid expansion type, situated in the intake of the engine. The second abutment 21a of the spring 20 bears on a push rod 21b through which the spring loads the lever 17.

Between the delivery of the low-pressure compressor 1 and the inlet of the high-pressure compressor 2, the engine comprises an annular duct and the outer wall 27 of this duct is formed with a valve chest having therein ports 28 which connect the duct to atmosphere and with which co-operate a number of valve members 29. The valve members 29 are arranged to be axially movable to cover and uncover the corresponding ports 28 and are connected through rod 30 to piston 31 of ram device 32. The outer wall 27 has a series of ports 28a in it to connect the valve chest to the duct between the low-pressure and high-pressure compressors. The piston 31 is loaded by a spring 33 in the sense of moving the bleed valve members 29 to uncover ports 28 and are also loaded by a fluid pressure in the cylinder space 34 on the side of the piston remote from the spring 33 in the sense of moving the bleed valve members 29 to cover the ports 28. The fluid pressure in the cylinder space 34 is obtained by connecting the space 34 to a source of fluid pressure, for example the high-pressure fuel supply line from the engine fuel pump or the engine lubricating oil supply, by means of a conduit 35 containing a restrictor 36, and the space 34 is also connected to the vent line 19.

The operation of the device is as follows:

When the rotational speed of the low-pressure rotor does not exceed the value in pre-selected relation to the speed of the high-pressure rotor, the forces acting on the lever 17 are such that the half-ball valve 18 tends to close the outlet of vent line 19. This allows the pressure in cylinder space 34 to build up, overcoming the spring 33 and causing the bleed valve members 29 to be moved to cover the ports 28.

The pre-selected relation between the rotational speeds of the low-pressure and high-pressure rotor is, in the illustrated arrangement, determined by suitably choosing the gear ratios in the gearing 38, 39 through which the pump devices 10, 11 are driven from the respective shafts 7 and 6.

When the speed of the low-pressure rotor exceeds the value in pre-selected relation to the speed of the high-pressure rotor, the force due to the pump device 10, assisted by the load of spring 20, overcomes the force due to pump device 11 and causes the lever 17 to be moved to open the vent valve 18. The pressure in cylinder space 34 therefore falls, enabling the spring 33 to move piston 31 in the sense to move the bleed valve members 29 to allow air to be bled off from the delivery of the low-pressure compressor 1.

The effect obtained with the invention is illustrated in Figure 3 in which the value of the rotational speed of the low-pressure compressor rotor is plotted as the ordinate and the rotational speed of the high-pressure compressor rotor is plotted as the abscissa. The normal operating speed relationship under steady running conditions is shown by the full line trace A, A', A'' and it is arranged that when the engine is gradually throttled back from the full power conditions indicated by the point MP, the rotational speed of the low-pressure rotor first falls off at a greater rate than the rotational speed of the high-pressure rotor. This occurs over the range of speeds, indicated by the trace portion A, associated with maximum power; over the range of speeds associated with cruising power, indicated by trace portion A', the speed of rotation of the low-pressure rotor is directly proportional to that of the high-pressure rotor; and under certain flight conditions, on further reduction of the power, the rotational speed of the low-pressure compressor is maintained constant and the speed of the high-pressure compressor rotor is reduced, as indicated by trace portion A''. The latter condition enables the engine to be accelerated rapidly to maximum power if necessary due for example to a baulked landing. It will be appreciated that when landing an aircraft it is desirable not only that the approach be made with the engine operating at the lowest practicable power (or even with the propeller windmilling) but also that it is possible to accelerate the engine to maximum power in a matter of seconds. The inertia of the low-pressure rotor, which includes the propeller, reduction gear, low-pressure compressor and turbine is very much higher than that of the high-pressure rotor which comprises the high-pressure compressor and turbine. It will be clear that, if an approach is carried out with the low-pressure rotor rotational speed at the value represented by the trace portion A'' and the high-pressure rotor speed reduced in order to reduce the power output of the engine, the high-pressure rotor may be accelerated quickly, if necessary, by the injection of additional fuel in the main combustion equipment, and since the low-pressure rotor is being accelerated from a higher initial speed, both may be accelerated to give maximum power in the short time.

Under other operating conditions, on reduction of power below the cruising range, the pitch of the propeller is prevented from becoming finer by a stop, which is withdrawn under the flight conditions just described. Thus the low-pressure rotor speed may be arranged to fall off as the power falls off to give a characteristic such as is indicated by trace C.

It is found however, especially where the low-pressure and high-pressure compressors have a comparatively small operating range of mass flows at each speed between the surging point and choking point, that reducing the rotational speed of the high-pressure compressor and thus reducing the mass flow which it will pass, whilst maintaining the rotational speed of the low-pressure compressor rotor constant in accordance with trace A'', tends to cause surging of the low-pressure compressor. This may be avoided by bleeding off air compressed by the low-pressure compressor, so that the low-pressure compressor passes a larger mass flow of air than the high-pressure compressor, the excess air being passed to atmosphere through the ports 28.

The arrangement of the invention ensures that the engine is protected not only against surging of the low-pressure compressor under approach conditions, but also the invention assists in protecting the engine against surging under all other speed conditions, including during accelerations. The line at which surging of the low-pressure compressor occurs is represented by the trace S in Figure 3, and the line at which uncovering of the bleed ports 28 occurs is represented by the trace B. The bleed ports 28 are uncovered to the left of trace B and are closed to the right of the trace. The abscissa of the point where the trace B intersects the axis is determined by the loading due to the spring 20.

In the foregoing, the actual rotational speeds of the rotors have been referred to, and no account has been taken of variation in intake temperature which alters the value of low-pressure rotor speed in relation to high-pressure rotor speed at which surging of the low-pressure compressor occurs. This alteration has the effect that an increase of the air intake temperature will result in a decrease of the speed of the low-pressure rotor at which surging occurs for any given speed of the high-pressure rotor, that is, the trace S is moved to the right as shown at $S_H$ in Figure 3. It is thus arranged that the temperature-sensitive capsule 22 loads the lever 17 to increase the load on spring 20 on increase of the intake temperature. Thus on increase of intake temperature a lower value of the pressure developed by the pump device 10 driven by the low-pressure rotor is required to open half-ball valve 18 and thus to reduce the pressure in cylinder space 34 permitting the bleed valve 29 to be opened under the influence of spring 33, to bleed off air delivered by the low-pressure compressor at a lower value of the low-pressure rotor speed for each value of the high-pressure rotor speed, as shown by the trace $B_H$.

It may be arranged that the maximum power of the engine is limited under low intake temperature conditions to a value obtained at normal intake temperatures, in order to avoid overstressing the engine. This may be done by reducing the rotational speed of the high-pressure rotor and maintaining the rotational speed of the low-pressure rotor constant at the maximum value, represented by the point $MP_C$ in Figure 3. At this point the bleed ports 28 would be uncovered under normal and high-temperature conditions.

Under low intake temperature conditions, however, surging of the low-pressure compressor also occurs at a lower value of the high-pressure rotor speed for a given value of the low-pressure rotor speed, as represented for example by the curve $S_C$. The rotational speed of the low-pressure rotor is permitted, by the action of capsule 22, to reach a higher value in relation to the speed of the high-pressure rotor before the bleed ports 28 are uncovered, as shown at $B_C$, and thus the maximum power of the engine under these conditions, represented by $MP_C$, is attained with the bleed ports covered, as is desirable.

It will be noted that the trace portion A will intersect the surge lines S for a value of the rotational speed of the low-pressure rotor somewhat above its maximum permissible value, indicated by point MP, and should such a condition occur, due for example to failure of the propeller constant-speed unit to act sufficiently rapidly, surging of the low-pressure compressor which would otherwise occur, will be prevented by the control in accordance with the invention, since it will be seen that the trace A will first cross trace B, indicating that the bleed ports 28 will be uncovered under these conditions before surging occurs, thus avoiding surge.

The surge point under normal temperature conditions, with the bleed valves open, would be as indicated by the trace $S_B$; this may be varied by change in ambient temperature in the manner shown for the other curves S, $S_H$ and $S_C$, but it will be seen that it is arranged to be clear of the operating conditions of the engine.

At low power under the conditions represented by trace C the bleed ports 28 will normally be uncovered (since the trace C at low powers lies to the left of trace B) and it will be seen that the possibility of surging will be remote since the trace C is well spaced from the surge lines $S_B$ which represents the combination of speeds at which surging of the low-pressure compressor occurs with the bleed valves open.

Referring now to Figure 4, there is illustrated a second form of control for the bleed valve members 29, in which a follow-up type of control is provided for the valve members and in which another form of device is used to obtain a speed signal.

The operating rod 30 of the valve members 29 is connected to a piston 50 separating a pair of cylinder spaces 51, 52, of which space 51 is supplied with pressure fluid through a branch 53 from the delivery 54 of the engine fuel pump 55, and of which space 52 contains a spring 56 loading the piston 50, is connected to the branch 53 through a restrictor 57 and has a vent duct 58 leading from it to a vent valve 59. The piston 50 is of the differential area kind with its smaller side facing space 51. Clearly when there is a bleed flow through duct 58 the pressure in space 52 falls, and the piston takes up a position dependent on the fluid pressure loads on it and on the strength of the spring 56.

The vent valve 59 is carried by a lever 60 which is loaded in the sense of opening the vent valve 59 by (a) a load from a diaphragm 61 determined by the pressure in space 61a, which is connected by pipe 62 to a device 110 giving a pressure representative of the rotational speed of the high-pressure compressors, and (b) by a spring load determined by the position of piston 50, which forms one abutment for a spring 63, the other abutment for which is a rod 64 bearing on the diaphragm 61.

The lever 60 is loaded in the sense of closing the vent valve 59 (a) by a load from diaphragm 61 due to the pressure in space 61b, which is connected by a pipe 65 to a device 111 giving a pressure representative of the rotational speed of the low-pressure compressor, and (b) by a load due to Bourdon tube 66 which is connected to the capillary tube 25 and temperature-sensitive element 26.

The bleed flow through vent valve 59 passes to a drain pipe 67, which may be connected to the suction side of the pump 55. It will be clear that in operation the piston 50 will take up a predetermined position dependent upon the rotational speeds of the low-pressure and high-pressure compressors and upon the intake temperature.

The devices 110, 111 are alike in construction. Each comprises a member 68 driven by the respective rotor of the engine, the member being in a chamber 69 having a pressure inlet containing a restrictor 69a joined to a second branch 70 of the pump delivery pipe 54. The member 68 is hollow and contains a flexible diaphragm 73 separating two spaces 71, 72 of which space 71 is open to the chamber 69 and space 72 is open through ports 74 and pipe 75 to drain pipe 67, and is open to chamber 69 through a valve controlled port 76, thereby to provide one outflow path from chamber 69 to drain. The chamber 69 is also connected to pipe 75 by a duct 80 containing two restrictors 81 in series. The port 76 is controlled by a valve element 77 carried at the end of an arm 78 mounted within the rotor 68 by means of a leaf spring 79 at the end of the arm 78 remote from the valve element 77. The arm 78 bears against the diaphragm 73 and so the arm is loaded in the sense of opening the port 76 by the pressure within the chamber 69. When the rotor 68 is being driven, the centrifugal loads on the arm 78 tend to move the valve element to close the port 76. Thus, as the rotational speed of the rotor 68 increases so the flow through the port 76 is cut off and the pressure within the chamber 69 increases due to the consequent increase in the restriction to flow from the chamber 69 to the pipe 75 and thus to drain pipe 67. The pressure signal for loading the diaphragm 61 is obtained from between the two restrictors 81 and thus in the case of the device 110, the pipe 62 is connected to the corresponding duct 80 between the restrictors 81 and in the case of the device 111 the pipe 65 is connected to the corresponding duct 80 between the restrictors 81. It will be clear that since the pressure in chamber 69 increases with increase of rotational speed of the corresponding rotor so the pressure applies to the diaphragm 61 by the devices 110, 111 increases with the rotational speed of the corresponding rotor.

The devices 110, 111 may be used also to give signals for controlling the fuel pump 55 in such a manner as to prevent overspeeding of either the low-pressure rotor or the high-pressure rotor by cutting down the fuel supply to the engine through the injectors 3a when either rotor tends to overspeed.

For instance, when the fuel pump is of the variable-angle-swash-plate type as shown, whereof the swash plate 82 is adjusted by means of a servo piston 83, the pressure signals obtained from the devices 110, 111 may be arranged to control the position of the servo piston 83 on overspeeding.

For instance, as shown, the servo piston may separate two chambers 84, 85, of which chamber 84 is connected directly to the pump delivery pipe 54 and the chamber 85 is connected to the pump delivery through a restrictor 86 and contains a spring 87 loading the piston towards the maximum fuel delivery position. In this case the pressure within the space 85 can be varied by bleeding off servo fluid from it in a controlled manner and in the illustrated arrangement the pressure signals from the devices 110, 111 are arranged to control corresponding bleed outlets.

Bleed passages are indicated at 88 and each is controlled by a valve element 89 carried at the end of a lever 90 which is loaded in the sense of closing the valve element 89 by a spring 91 and in the sense of lifting the valve element 89 to increase the bleed flow past it by a diaphragm 92 subjected to the pressure signal from the corresponding device 110 or 111. The diaphragm 92 forms one wall of a chamber 93 connected by a pipe 94 to the pipe 62 in one case and to the pipe 65 in the other case. The chamber 95 on the other side of the diaphragm 93 is connected to the drain pipe 67 which conveniently leads to the inlet of the fuel pump 55. An adjusting spring 96 is provided having one end connected to an adjustable abutment 97 and the opposite end connected to the diaphragm 92 which is loaded by the signal pressure determined by the high-pressure rotor rotational speed. By adjustment of the abutment 97 the maximum rotational speed of the high-pressure rotor can be adjusted.

The fuel pump 55 is shown as drawing fuel from a fuel tank 98, and the pump delivery pipe 54 leads to the fuel injectors 3a and contains a throttle valve 99 and a shut-off cock 100. The pressure drop across the throttle 99, and so the flow past it for each setting of the throttle 99, is controlled by a barometric flow control device 101, the construction and operation of which is well-known and does not form part of this invention.

We claim:

1. A gas-turbine engine of the type having a low-pressure compressor, a high-pressure compressor, combustion equipment, a high-pressure turbine and a low-pressure turbine arranged in flow series, the high-pressure compressor being connected to the high-pressure turbine to be driven thereby and the low-pressure compressor being connected to the low-pressure turbine to be driven thereby, and in which the high-pressure and low-pressure compressors are rotatable independently of one another and the low-pressure turbine is connected to a propeller to drive it, comprising a bleed valve through which air compressed in the low-pressure compressor may be vented to atmosphere without passing through the high-pressure compressor, and control mechanism connected to the bleed valve to operate it and including a first rotary pressure-producing device adapted to produce a fluid pressure which is a function of its rotational speed, a mechanical drive connection from the low-pressure compressor to said first rotary pressure-producing device to drive it at a rotational speed proportional to that of the low-pressure compressor, a second rotary pressure-producing device adapted to produce a fluid pressure which is a function of its rotational speed, a second mechanical drive connection from the high-pressure compressor to said second rotary pressure-producing devices to drive it at a rotational speed proportional to that of the high-pressure compressor, and a pressure-sensitive device connected to the bleed valve to open it and connected to both said rotary pressure-producing devices to be subjected in the sense to open the bleed valve by the fluid pressure produced by the first rotary pressure-producing device and in the opposite sense by the fluid pressure produced by the second rotary pressure-producing device, whereby the bleed valve is opened when the rotational speed of the low-pressure compressor exceeds a value having a preselected relationship to the rotational speed of the high-pressure compressor.

2. A gas-turbine engine as claimed in claim 1, wherein the control mechanism also comprises a spring connected to the pressure-sensitive device to load it in the sense to open the bleed valve.

3. A gas-turbine engine as claimed in claim 1, wherein the control mechanism also comprises temperature-sensitive means responsive to the ambient atmospheric temperature, and connected to the pressure-sensitive device to subject it to a load, which increases with increase of said temperature, in the sense to open the bleed valve.

4. A gas-turbine engine as claimed in claim 3, wherein the control mechanism also comprises a spring connected to the pressure-sensitive device to load it in the sense to open the bleed valve.

5. A gas-turbine engine as claimed in claim 1, wherein the control mechanism also comprises a servo-mechanism including a member operatively connected to the bleed valve, resilient means connected to said member to load it in the sense to open the bleed valve, and means to apply a fluid pressure load to said member, said last-mentioned means including the pressure-sensitive device.

6. A gas-turbine engine as claimed in claim 1, wherein the control mechanism also comprises a servo-mechanism including a piston operatively connected to the bleed valve, a cylinder in which said piston slides, a spring in said cylinder and adapted to load said piston in the sense to open the bleed valve, means defining a pressure space in said cylinder on one side of the piston, means defining an outlet from said pressure space, and a vent valve cooperating with said outlet and connected to said pressure-sensitive device to be operated to cause opening of the bleed valve when the rotational speed of the low-pressure compressor exceeds the value thereof determined by the preselected relation and the rotational speed of the high-pressure compressor.

7. A gas-turbine engine as claimed in claim 6, wherein the control mechanism also comprises a second spring adapted to load the pressure-sensitive device in the sense to open the bleed valve.

8. A gas-turbine engine as claimed in claim 6, wherein the control mechanism also comprises temperature-sensitive means responsive to the ambient atmospheric temperature, and connected to the pressure-sensitive device to subject it to a load, which increases with increase of the temperature, in the sense to open the bleed valve.

9. A gas-turbine engine as claimed in claim 8, wherein the control mechanism also comprises a second spring adapted to load the pressure-sensitive device in the sense to open the bleed valve.

References Cited in the file of this patent
UNITED STATES PATENTS

| | | |
|---|---|---|
| 1,111,498 | Rotter | Sept. 22, 1914 |
| 2,559,623 | Holmes | July 10, 1951 |